(12) United States Patent
Murotake et al.

(10) Patent No.: US 7,840,763 B2
(45) Date of Patent: Nov. 23, 2010

(54) METHODS AND SYSTEMS FOR ACHIEVING HIGH ASSURANCE COMPUTING USING LOW ASSURANCE OPERATING SYSTEMS AND PROCESSES

(75) Inventors: David K Murotake, Nashua, NH (US); Antonio Martin, Nashua, NH (US)

(73) Assignee: SCA Technica, Inc., Nashua, NH (US)

(*) Notice: Subject to any disclaimer, the term of this patent is extended or adjusted under 35 U.S.C. 154(b) by 553 days.

(21) Appl. No.: 11/855,633

(22) Filed: Sep. 14, 2007

(65) Prior Publication Data

US 2008/0016313 A1 Jan. 17, 2008

Related U.S. Application Data

(63) Continuation-in-part of application No. 11/079,673, filed on Mar. 14, 2005, now Pat. No. 7,490,350.

(60) Provisional application No. 60/552,782, filed on Mar. 12, 2004, provisional application No. 60/825,793, filed on Sep. 15, 2006.

(51) Int. Cl.
G06F 12/00 (2006.01)
G06F 13/00 (2006.01)
G06F 13/28 (2006.01)
G06F 7/04 (2006.01)
G06F 12/14 (2006.01)
G06F 17/30 (2006.01)
G11C 7/00 (2006.01)
H04L 29/06 (2006.01)

(52) U.S. Cl. ............ 711/153; 711/152; 711/163; 726/17; 713/164

(58) Field of Classification Search ......... 711/152–153, 711/163; 726/17; 713/164
See application file for complete search history.

(56) References Cited

U.S. PATENT DOCUMENTS

| 7,676,608 B1* | 3/2010 | Crosmer et al. .............. 710/36 |
| 7,676,673 B2* | 3/2010 | Weller et al. ................ 713/164 |
| 7,734,933 B1* | 6/2010 | Marek et al. ................ 713/193 |
| 2002/0035687 A1 | 3/2002 | Skantze |

(Continued)

FOREIGN PATENT DOCUMENTS

WO 00/67445 11/2000

(Continued)

OTHER PUBLICATIONS

Lockheed-Martin et al. Protection Profile for Partitioning Kernels in Environments Requiring Augmented High Robustness Jun. 9, 2003.*

(Continued)

*Primary Examiner*—Kevin L Ellis
*Assistant Examiner*—Ryan Bertram
(74) *Attorney, Agent, or Firm*—Vern Maine & Associates

(57) ABSTRACT

A computing system contains and uses a partitioning microkernel (PMK) or equivalent means for imposing memory partitioning and isolation prior to exposing data to a target operating system or process, and conducts continuing memory management whereby data is validated by security checks before or between sequential processing steps. The PMK may be used in conjunction with an Object Request Broker.

8 Claims, 12 Drawing Sheets

U.S. PATENT DOCUMENTS

| | | | |
|---|---|---|---|
| 2002/0080967 | A1 | 6/2002 | Abdo et al. |
| 2002/0099959 | A1 | 7/2002 | Redlich et al. |
| 2002/0147920 | A1 | 10/2002 | Mauro |
| 2002/0166068 | A1 | 11/2002 | Kilgore |
| 2003/0031151 | A1 | 2/2003 | Sharma et al. |
| 2003/0095663 | A1 | 5/2003 | Nelson et al. |
| 2003/0140238 | A1 | 7/2003 | Turkboylari |
| 2003/0200455 | A1 | 10/2003 | Wu |
| 2003/0204719 | A1 | 10/2003 | Ben-Itzhak |
| 2003/0210788 | A1 | 11/2003 | Billhartz et al. |
| 2003/0219129 | A1 | 11/2003 | Whelan et al. |
| 2003/0220765 | A1 | 11/2003 | Overy et al. |
| 2003/0233567 | A1 | 12/2003 | Lynn et al. |
| 2003/0236990 | A1 | 12/2003 | Hrastar et al. |
| 2004/0003280 | A1 | 1/2004 | Narayanan et al. |
| 2004/0008840 | A1 | 1/2004 | Ferguson |
| 2005/0223184 | A1* | 10/2005 | Russell et al. ............... 711/170 |
| 2007/0032920 | A1* | 2/2007 | Dapp et al. .................... 701/3 |
| 2007/0136721 | A1* | 6/2007 | Dunshea et al. ............. 717/174 |

FOREIGN PATENT DOCUMENTS

| | | | |
|---|---|---|---|
| WO | | 2004/068817 A2 | 8/2004 |

OTHER PUBLICATIONS

"Everbee Networks Announces Hassle-Free PC Security Device for Families and Professionals", [online] [Retrieved on Jun. 3, 2004] Retrieved from the Internet <URL:http://www.prweb.com/printerphp?prid=106411>, 1997-2004, PR Web.

"Security Anytime, Anywhere", pp. 1-2, Everbee Networks.

"3Com Embedded Firewall for the 3CR990 NICs Family", 2001, pp. 1-4, 3Com Corporation.

"3Com Embedded Firewall Architecture for E-Business", 2001, pp. 1-4, 3Com Corporation.

"The Wireless Hacker Project", Apr. 2003, pp. 1-4, KPMG's UK Design Services.

"NVIDIA nForce3", [online] [Retrieved on Jun. 3, 2005] Retrieved from the internet <URL:http://www.nvidia.com/page/nf3.html>, 2005, pp. 1-2, NVIDIA Corporation.

"3rd Generation Partnership Project; Technical Specification Group Services and System Aspects; 3G Security; Security Threats and Requirements (Release 4)", 2001, pp. 1-26, 3GPP TS 21.133 V4.1.0 (Dec. 2001), 3GPP Organizational Partners.

"Everbee Networks Introduces Secure Personal Networking Solution Based on Motorola PowerQUICC and Security Processors", [online] [Retrieved on Jun. 3, 2004] Retrieved from the internet <URL:http://www.emediawire.com/printer.php?prid=83724>, pp. 1-2, Everbee Networks.

"RG-Firewall", [Online] [Retrieved on Mar. 26, 2004] Retrieved from the internet <URL:http://www.jungo.com/openrg/rgfirewall.html>, pp. 1-2.

"OpenRG for Wireless Gateways and Access Points", 2003, pp. 1-2, Jungo Software Technologies Inc.

"High Assurance Wireless Computing System (HAWCS)", [online] [Retrieved on Aug. 26, 2004], Retrieved from the Internet <URL:http://www.hawcs.com/—High Assurance Wireless Computing System (HAWCS)>, pp. 1-2.

"Wireless LAN Security-What Hackers Know That You Don't", 2003, pp. 1-9, AirDefense, Inc., Alpharetta, GA.

"Everbee Embedded Software", [online] [Retrieved on May 13, 2004] Retrieved from the internet <URL:http://www.everbee.com/index.php?rub_id=2&sub_id=2>, 1994-2004, pp. 1-3, Everbee Networks.

"Deepnines' Sleuth9 Security System Immediately Stops", [online] [Retrieved on Mar. 8, 2004] Retrieved from the internet <URL:http://www.deepniness.com/press_releases/pr101403.html>, Oct. 13, 2003, pp. 1-2, DeepNines, Inc.

"Everbee xNSP", [online] [Retrieved on May 13, 2004] Retrieved from the internet <URL:http://www.everbee.com/index.php?rub_id=2&sub_id=1>, 1994-2004, pp. 1-2, Everbee Networks.

"Security at the Gate. All in One", 2004, pp. 1-4, Everbee Networks.

"A USB Key for Portable, Personal Internet Security", [online] [Retrieved on May 13, 2004] Retrieved from the internet <URL: http://www.everbee.com/index.php?rub_id=2&sub_id=6>, 1999-2004, pp. 1-3, Everbee Networks.

* cited by examiner

METHODS AND SYSTEMS FOR ACHIEVING HIGH ASSURANCE COMPUTING USING LOW ASSURANCE OPERATING SYSTEMS AND PROCESSES

RELATED APPLICATIONS

This application claims priority as a continuation-in-part application to pending U.S. application Ser. No. 11/079,673, filed Mar. 14, 2005, which claims priority to U.S. Application No. 60/552,782, filed Mar. 12, 2004; and claims priority to U.S. Application No. 60/825,793, filed Sep. 15, 2006. Each of these applications is herein incorporated in its entirety by reference.

FIELD OF THE INVENTION

The invention relates to high assurance computing, and more particularly, to achieving high assurance computing in systems that utilizes low assurance environments.

BACKGROUND OF THE INVENTION

Current means of computational operation revolve around large and relatively insecure operating systems like Microsoft's Windows, Apple's OSX, the various Linux variants and other monolithic operating systems. The large size of their code base makes it nearly impossible to attain high level of assurances. As a result, the integrity of such an operating system is always questionable. Viruses and other malware can penetrate a system, hiding themselves either within the environment or external to it, running in parallel. In either case, detection of such malicious software can be impossible since the infection has compromised the environment, subverting detection mechanisms.

SUMMARY OF THE INVENTION

Accordingly it is an object of the invention to provide a novel and useful system and associated methods that can solve the problems described herein. More specifically, it is an objective of the invention to leverage high assurance computing capabilities to protect lower assurance operating systems. To this end, a computing system is provided with and uses a high assurance kernel, a partitioning microkernel (PMK) or equivalent means for imposing memory partitioning and isolation prior to exposing data to a target operating system or process, and for continuing memory management whereby data is validated by security checks before or between sequential processing steps.

The invention in one aspect is a high assurance computing system that contains a high assurance, partitioning microkernel (PMK) or other such operating system capable of enforcing memory isolation and partitioning. The PMK may employ multiple independent levels of security (MILS) and be referred to as a (MILS) PMK. The PMK can also use a memory management unit (MMU) to enforce memory partitioning. According to one embodiment the system also contains an Object Request Broker.

According to one aspect of the invention the PMK isolates or contains at least one lower assurance operating system such as a Windows XP, Linux, or OSX, or at least one process such as a web browser or email client. (The Applicant makes no claims to the trademarks associated with the referenced operating systems and processes that it may isolate or contain, registered or otherwise.) The PMK may be instantiated by a boot kernel. A high assurance computing system of the invention may further comprise incoming and outgoing data to and from a contained operating system, which flows through a set of security processes in an inline manner. There may be a set of security processes that are contained in their own memory partition.

Simply stated, a high assurance computing system (HACS) of the invention consists of the high assurance components described herein and the affected user's operating systems and processes. The presence and performance of the high assurance components of the HACS in association with its contained operating systems and processes may be transparent to the user in normal operation, while providing increased security and protection.

An HACS system of the invention may also have a process or set of processes, which are contained in their own memory partition, and provide security administration and or authentication.

An HACS system may consist of or reside on a laptop, PC, PDA, Cell Phone, computer server, a multi CPU or multi core embedded system, or other such computing device or computer-based platform.

An HACS system can also reside on and function in a platform such as a communication card; a motherboard chipset; a motherboard chipset and computer CPU(s); a computer CPU; or a system with multiple CPU's.

According to one aspect of the invention, a first processor boots a PMK. The first processor PMK can partition the shared memory for all processes on a platform. The first processor PMK can also partition the shared memory for all processors on a platform. The processors can take their partitioned memory and further partition it for their own set of processes.

In another aspect of the invention, an HACS system enforces inline security processing of data flowing in and out of an operating system or process. The security processing may consist of firewall, virus checking, malware checking, spam filtering, intrusion detection or a VPN, or a combination of these.

Data flowing into the HACS is checked by the security processing prior to being delivered to at least one intended, contained operating system or process. The security process can handle user authentication and be networked with a central authentication system.

In one aspect, the invention includes having a PMK means of passing data across partitions whereby controlling memory partitions can dynamically alter other memory partition's abilities to read or write to certain memory sections. The HACS system may consist of a PMK operating in the main CPU, inline security processing, at least one contained operating system and a boot kernel.

The system may further include security processes that have the ability to examine the memory of the contained operating system, checking it for viruses, malware and other unwanted or unauthorized processes. The system includes processing means such that when a virus, malware, or other unwanted or unauthorized processes is detected, the system operator is informed and queried for appropriate action and such information is written to a log.

The system can provide notification wherein, upon detection, a central network monitoring system and or administrators are informed. The platform may contain a trusted computing module or other such device and a set of processes in their own memory partition, outside of the reach of the contained operating system, that implement trusted computing module functionality. Such functionality can be used for user authentication, key management for VPNs, code authentication, and or key management for disk encryption/decryption.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
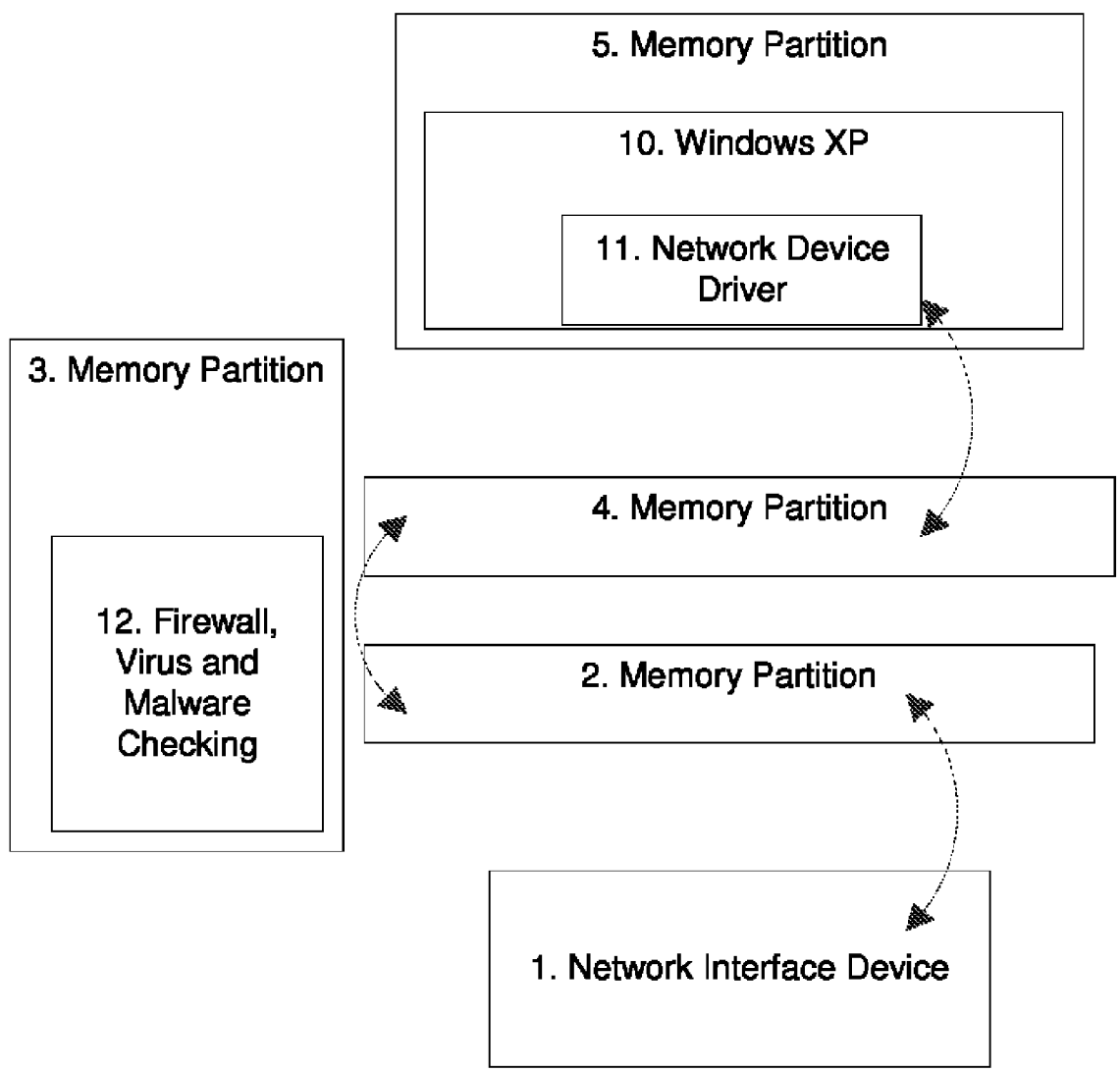
FIG. 1 is a block diagram depiction of elements of one embodiment of the invention where a network interface device is separated by two inline, two way, memory partitions from a network device driver.

The development of partitioning micro-kernels (PMK), especially the multiple independent levels of security (MILS) partitioning micro-kernels (PMK), has opened the way to allow for high assurance computing even within low assurance operating systems.

Utilizing a MILS or MILS-like PMK, lower security operating systems or processes can be contained by placing the environment within its own memory partition. This prevents any infections in the contained environment from effecting processes in other memory partitions. Furthermore, security functionality can be instantiated in a separate memory partition, capable of examining the state and memory of the lower security operating system (LSOS) or lower security process (LSP). As a result, malware infections cannot hide from external inspection responsible for verifying the integrity of the contained operating system.

Using the PMK, all incoming communications and or data flow within the security partition prior to reaching the lower security operating system contained in its memory partition. Firewalling and data inspection and other such protection mechanisms can take place within this security partition(s). As a result, no matter the networking device attached to the computational system, the information can be protected before it flows into the LSOS or LSP.

The security partition can employ system and security administration, inter-processor/network control flow management and red/black reconfiguration or it can be contained in a second memory partition. Other configurations are within the scope of the invention. At boot, a boot kernel will insure that a PMK is instantiated and seizes control of the host CPU(s). This may be analogous to a BIOS or EFI (Extensible Firmware Interface).

Hereafter are described five examples of high assurance computing systems (HACS) of the invention, which may be further characterized as high assurance wired or wireless computing systems (HAWCS).

EXAMPLE 1

This embodiment places protection mechanisms in a wireless card/radio. This example utilizes a combination of techniques including but not limited to high evaluation assurance level or EAL components, partitioning micro kernels, ORBs, MILS and MILS-like technology, firewalls, data inspection systems, VPNs, encryption units and integrity daemons. A partitioning microkernel is used to create memory partitions that contain and confine various running programs like applications and operating systems. These partitions can limit the external memory access of those processes running internal to memory in other partitions.

For example, assume process A operates in partition A and process B operates in partition B. If both are separate/independent processes, then neither would have read or write access to each other's memory addresses. This hardware enforcement prevents malicious and or accidental transfer of information from one process to the next. Another possible function is where process A is granted limited access rights into the memory partition of process B. Process A could have full read access into process B's partition, for the sake of examining B's state and health. It may then have write privileges for a very small memory section of process B's partition for writing messages of state information to inform B of its health. One such example is Microsoft's EAL 6+ Multiple Independent Levels of Security (MILS) partitioning microkernel that offers strong enforcement of these partitions. The partitioning microkernel establishes these partitions and they are enforced via a hardware MMU or some other such means of enforcement. Thus once established, they are difficult, if not nearly impracticable, to bypass.

EXAMPLE 2

This Example illustrates placing protection mechanisms in a computer chipset. These protection mechanisms are similar but are not limited to those listed in the wireless card/radio example. By placing these protection mechanisms into, for example, a computer motherboard's chipset, all communication passes through the chipset and thus all information flowing into and out of the computer is protected. Furthermore, the chipset is capable of examining the state of the computer's memory and CPU, examining the operation of the current operating systems, looking for viruses, infections, root kits and other malicious software.

The chipset can also monitor and enforce direct memory access (DMA). Predefined ranges of memory addresses are enforced, preventing DMA devices the ability to read and write over memory indiscriminately. The predefined ranges can be configured at boot by the BIOS and updated by processes like operating systems in the CPU during and after boot.

EXAMPLE 3

This Example illustrates extending the partitioning microkernel and protection mechanisms from the chipset into the CPU. This allows the two sections of the security layer to communicate, not only being able to identify problems with the host operating systems, but also strictly containing the soft OS (e.g. Windows XP, Linux) within the partitioning microkernel on the host CPU. One such practice has the chipset boot first; it then conducts a self examination and also examines the software for the CPU, and then starts, instantiates or allows the security layer on the CPU to boot. This security layer can be a partitioning micro kernel, where a hardware MMU partitions the memory of the system and contains or isolates it to a lower assurance operating system. Examples of such lower assurance operating systems include but are not limited to those operating systems commonly available in the market such as Microsoft's Windows family, Apples OSX and the various Linux distributions.

The security layer can create a second memory partition that would operate various security sub system functionalities specific for the contained operating system (COS). It can boot multiple COS's; allowing the user to switch between different contained operating systems.

It should be noted that when the security layer that contains a partitioning microkernel boots in the CPU, it will "seize" the CPU's MMU, verify that no memory has been allocated and, if available, communicate with the motherboard chipset and perform other self check functionality. A further embodiment creates a partition to act as a communication bridge between the chipset and the CPU. This high assurance component takes over the responsibilities of filtering/firewall for all outgoing communications. On boot, it loads the required operating systems and programs. If there is more than one, it presents to the operator a list of available COS's to boot. On selection of a COS or multiple COS's, it sets up memory partitions for the COS's and if available, memory partitions for a security subsystem tailored for the specific COS. It then loads or boots the security subsystem, verifies it booted properly and then boots the desired COS. Furthermore, when the COS is selected by a user, the user can be asked what portion of the available memory is to be utilized. For example the user might select half the available memory for this COS. In this way, a second COS can be booted later, running parallel to the first COS and the security layers.

EXAMPLE 4

In this embodiment, there is a system without a HAWCS motherboard chipset, where all the HAWCS functionality is ported into the CPU. Like the CPU/chipset configuration, the CPU configuration is similar except that it carries all protection functionality onboard. Thus, it filters incoming and outgoing data either within the base security boot layer, in a separate communication partition or in a security subsystem partition for the specific COS. Thus in one implementation, the security layer boots first, seizes control of the systems hardware MMU, creates a memory partition and within it, boots the communication control and protection security subsystem.

It then creates two more partitions, one being the security subsystem, a specially tailored set of processes that has read and potential write access to some, if not all of the select COS's memory partition. These processes contain virus, root kit, spyware and malware detection mechanisms. These processes are started, verify proper functioning, and get updates for detection lists before the primary COS is booted. Once all the security layers are established, then the COS is allowed to boot.

In other embodiments, the security layer traps certain inputs, like a specific key sequence that calls up a boot menu, and if memory is available, allows the booting of another Contained Operating System (COS). Another embodiment allows movement between the different COS's. Yet another embodiment has a small application that runs in each COS, where it allows the user to select the COS they want to switch to. This small program reads a memory space that the security layer writes to, and provides information about the available COS's running. When a user selects a different COS, the application writes a message in its memory, the security layer sees this message, switches the user's viewed COS, and then clears the memory written to.

EXAMPLE 5

Another architecture embodiment includes a multi CPU system. This example includes but is not limited to a dual core CPU, multi CPU computer and embedded, multi CPU systems, optionally with globally shared memories. In this system, the security layer first boots up on one of the CPUs. It then partitions the memory for the various processors and processes and then the other CPUs boot within their defined memory partitions. There are several variants to this embodiment. When the first CPU boots with its security layer/kernel, it can query the security layers of the various CPUs, requesting how much memory and what configurations they need. It can also already have in its access, a preconfigured memory allocation list that it can act upon. The primary boot kernel can then allocate the memory partitions, fixing their addresses, sizes, and operations, i.e. who has read/write access, and then inform the various CPU's of their allocations.

The main CPU can also communicate this information to a centralized memory controller that can then limit and contain the memory each CPU has access. Another embodiment has the primary CPU signaling the memory limitations to the slave CPU by informing their MMU directly. In the last two cases, the slave CPUs then have no concept that their memory has been contained or partitioned, they only have knowledge of the memory set aside for it. Lastly, the individual process partitions can be set up by the primary CPU setting up the memory partitions, or the primary CPU can just allocate/partition a section of memory to each subservient CPU and then a security layer/kernel on each of those CPU's then configures its own memory partitions for the processes as needed.

Still another embodiment provides for the case of a failure for the primary CPU, where a succession of CPUs is laid out for backup. Yet still another variant provides for multiple, independent CPU's where there is no governing CPU, as each CPU has its own security layer and sets up and requests memory partitions, launching its own set of processes. There may be fixed or self-teaching housekeeping rules or algorithms by which the independent CPU's co-exist and co-function independently, with high assurance, on the same platform.

One interesting variant of the multi-CPU embodiments provides for a single CPU with a security layer that instructs a memory controller as to which CPUs have access to certain memory sections. In this way, a single security layer partitions the memory for multiple CPUs while the CPUs are running legacy operating systems. The COS's on the other CPUs boot up and see only the memory that they have been configured for; their main memory for operation and a shared set of memory for DMA or other data sharing memory sections. The processes running on the respective CPU's have no way of writing to or corrupting the memory for other CPU's.

In a multi or multicore CPU (e.g. dual core, quad core) system, the security layer can be in multiple cores/CPUs or in just a single core/CPU, as long as it boots first and partitions memory, starting the protection processes (firewalls, virus checkers, etc.) before starting the respective COS's.

One configuration is where a security layer is first, providing the basis of a partitioning microkernel. An example of such a configuration is a MILS kernel. This microkernel is an EAL high (4+) kernel that leverages a MMU to enforce memory partitions for the various processes operating on top of it. A second layer can be a MILS-like Object Request Broker (ORB); and a third layer can be IP filtering mechanisms like firewalls, data inspection (virus, malware), spam filtration systems and more. Another layer may focus on process control and reconfiguration.

According to one embodiment of the invention, the system separates these functions of protection and places them in between the likely sources of attack and the lower security operating systems and environments. These protection mechanisms are placed where the softer operating system/environment cannot access them directly. Since the main or soft operating system can be compromised, this system architecture limits the possibility of compromising the protection mechanisms.

Referring now to FIG. 1, according to some embodiments of the invention, VPN, firewall, virus checking and other filtering functions are conducted on data prior to its flowing into an operating system. This can be enforced in the HAWCS architecture. FIG. 1 shows an example of how data can flow into a system, enforcing inline processing. First, data comes in to the Network Interface Card or other such device. Utilizing DMA, the Network Interface Device 1 writes the data into the first memory partition 2 that the NIC has write access to. The various checking functions 12 like virus checking, firewall, etc., contained in their own partition 3, then examine the packet/data and if everything is satisfactory, then copies the data from memory partition 3 into memory partition 4. For data in this second memory partition 4, the target COS's driver 11, contained in partition 5, reads the information. In other words, the data cannot flow from network interface device 1 into the memory partition 5 for the Windows XP COS 10 to read until the HAWCS™ processing 12 takes place on the data set and then moves it over into the prescribed readable memory section.

To illustrate the general case represented by FIG. 1, a user of the contained soft OS pings an external machine. As the ping UDP packet comes back, it first enters the NIC from the network (be it wired or wireless), and the NIC write the packet into the memory to which it has write permissions. The security functions then examine the packet, checks that it has no viruses, is not malformed and that the UDP packet is OK to pass though the firewall. After it passes all checks, it is then written into the memory partition for the "soft" Contained OS (COS) and the COS driver is signaled that it has data to read. The COS driver reads in the data and then processes it though its IP stack. If the security checks on the memory buffer do not pass, various different actions can be taken from dropping the packet to informing the target OS of a found attack.

Figure 2:
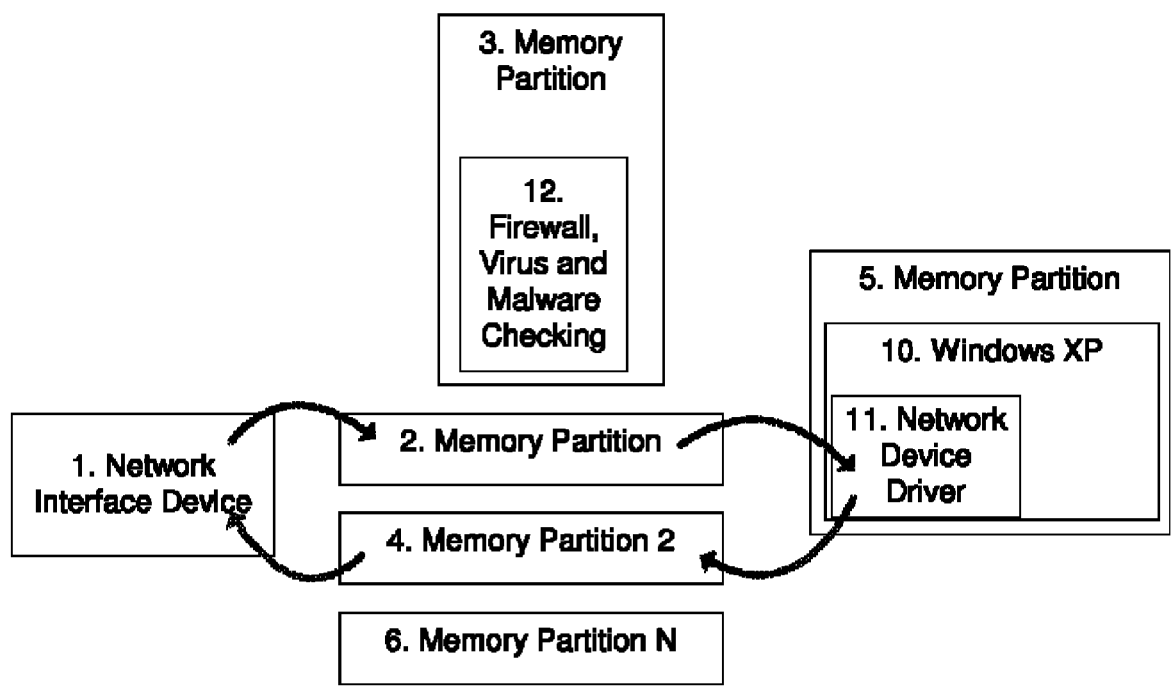
FIG. 2 is a block diagram depiction of elements of a further embodiment where a network interface device is separated from a network device driver by two, one way memory partitions.

Referring now to FIG. 2, there is illustrated a case of inline processing utilizing closer to zero copy capabilities. In this case, all memory access happens within a single memory partition. The Network Interface Device 1 writes data into a "buffer" in a special memory partition 2. The HAWCS™ processing function 12, residing within partition 3, then locks the "buffer" partition 2 so that the Network Interface Device 1 can no longer write to it. Function 12 then checks the data for viruses, malware, firewall and/or other security functionality. If and after the checks pass, the HAWCS processing function 12 then unlocks buffer memory 2 so the "soft" COS 10 in partition 5 can then read the data, inform the target COS's driver 11 that the data is available (e.g. trigger an interrupt or writing to a memory section that is being polled, etc.). The target COS network device driver 11 performs processing on memory 2 and then informs the HAWCS™ processing function 12 that it is finished (e.g. marking a memory byte to "done" or other signaling technique). The HAWCS processing function 12 then sets memory partition 2 so that the target COS can no longer can read that memory section and so the network interface device 1 can write to it. It then marks the buffer available for network interface device 1 to write to.

To increase potential throughput, n number of memory partitions, e.g. partitions 4 and 6, can be added so that while one partition is being used, another is available. Further, certain partitions can be designated for outgoing data (where network device driver 11 has write access and the network interface device 1 has read access) or incoming data.

The handling of these memory partition queues can be controlled by the partitioning kernel (not depicted). The network interface device requests from the kernel a buffer. The kernel verifies that the NID has write privileges for the requested buffer. The kernel then gives the NID a pointer, or object associated with an available memory partition (e.g. partition 2, 4 or 6) and no other process will have access to that partition until the NID has finished its write and releases the "lock" on the buffer back to the kernel. The kernel then informs HAWCS™ processing function 12 that data is available and grants it read and write permissions. Likewise, HAWCS™ processing function 12 can be pending, waiting for access to the partition and will only have access once the prior lock has been released. Firewall, virus and or malware checking function 12 then inspects the data, verifies its integrity and access capabilities. If all checks are passed, it then relinquishes its read/write access on the partition and the kernel informs the COS 10 that data is available. The COS is then able to read the data in and process it. In other words, the kernel can impose a series or sequence of "locks" on memory partitions, that permits a coordinated a set of processing steps to be applied to the data before it is delivered to the COS 10. The changing of the read/write capabilities of certain memory locations is controlled by the HAWCS processing function 12 through requests sent to the PMK that then enforces these requirements through the processor's MMU.

Figure 3:
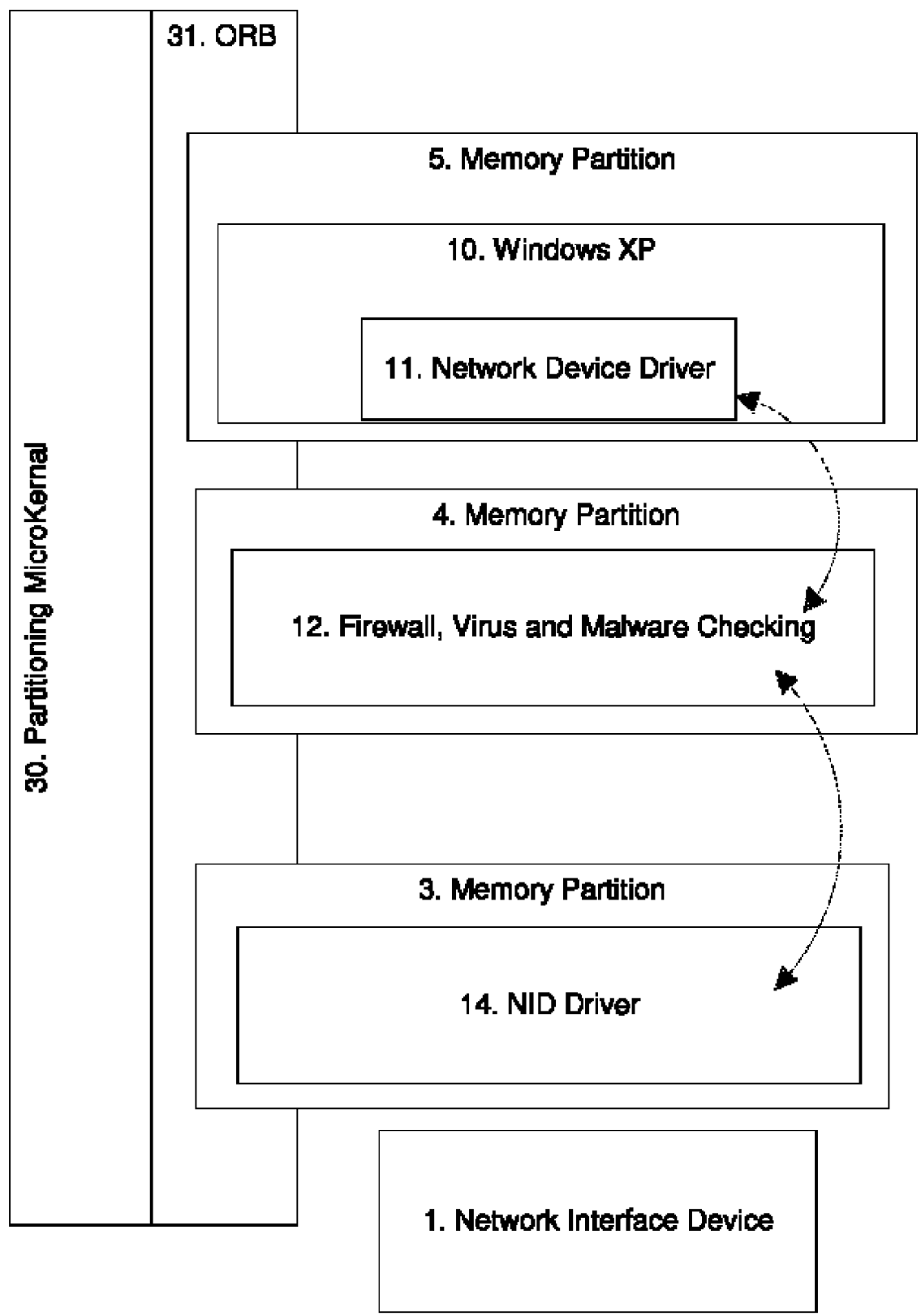
FIG. 3 is a block diagram depiction of elements of another embodiment where one memory partition has an embedded firewall, virus and malware checking capability, and another memory partition has an embedded NID Driver functionality.

Referring now to FIG. 3, there is illustrated in accordance with the invention the utilization of middleware, in this case an Object Request Broker ORB 31, to move data among the various memory partitions. In this example, data coming into NID 1 is handled by the NID Driver 14, which makes an ORB 31 call to push (or pull) the data to the firewall, virus and malware checking function 12. Once checking is complete, the checking process(es) function 12 then pushes the data via ORB (31) and makes a call to network device driver 11 for final delivery to the Windows XP COS 10. Likewise, data can flow down from the Windows XP COS 10 in a reverse manner, as illustrated in FIGS. 4, 6 and 7.

One attack in a soft operating system that is difficult to counter is the attack from a root kit. This type of attack is able to hide itself within or along side the operating system, rendering virus checking mechanisms within the operating system worthless. Since these types of defensive mechanisms rely on the underlying OS for their detection methods (for example, "list all processes") a root kit is able to subvert those calls, filter out the information it does not want discovered and only return the information it wishes. Thus the protection processes, and the user, can be fooled into thinking everything is functioning properly.

However, one solution to the root kit problem in accordance with the invention is to place the protection mechanisms outside of the OS and limit the OS's ability to write and/or read into the partitions that contain the protections processes. Thus, a memory partition containing a virus checking software might have read and write access to the COS's memory partition, but the COS would have no read or write capabilities on the virus checking systems memory. Accordingly, an infection in the COS will not affect the virus protection system, nor the underlying security layers and kernel. The external virus checking processes can examine the COS memory, actively looking for virus, malware and or other unauthorized processes. The virus checking system, if a potential virus is found, can halt the COS from further processing and, for example, initiate processing that informs the user of a potential virus infection, asking the user if they wish for an attempt to automatically fix the problem, reboot and attempt to remove the virus, disable the network interface, continue operating or other such remedial action. Such high assurance processing can also work in conjunction with processes running inside the COS, thus providing a bridge of information to virus, malware, etc checking systems inside the COS. The alerting or informing action can include informing a central network monitoring system and/or administrators.

Figure 4:
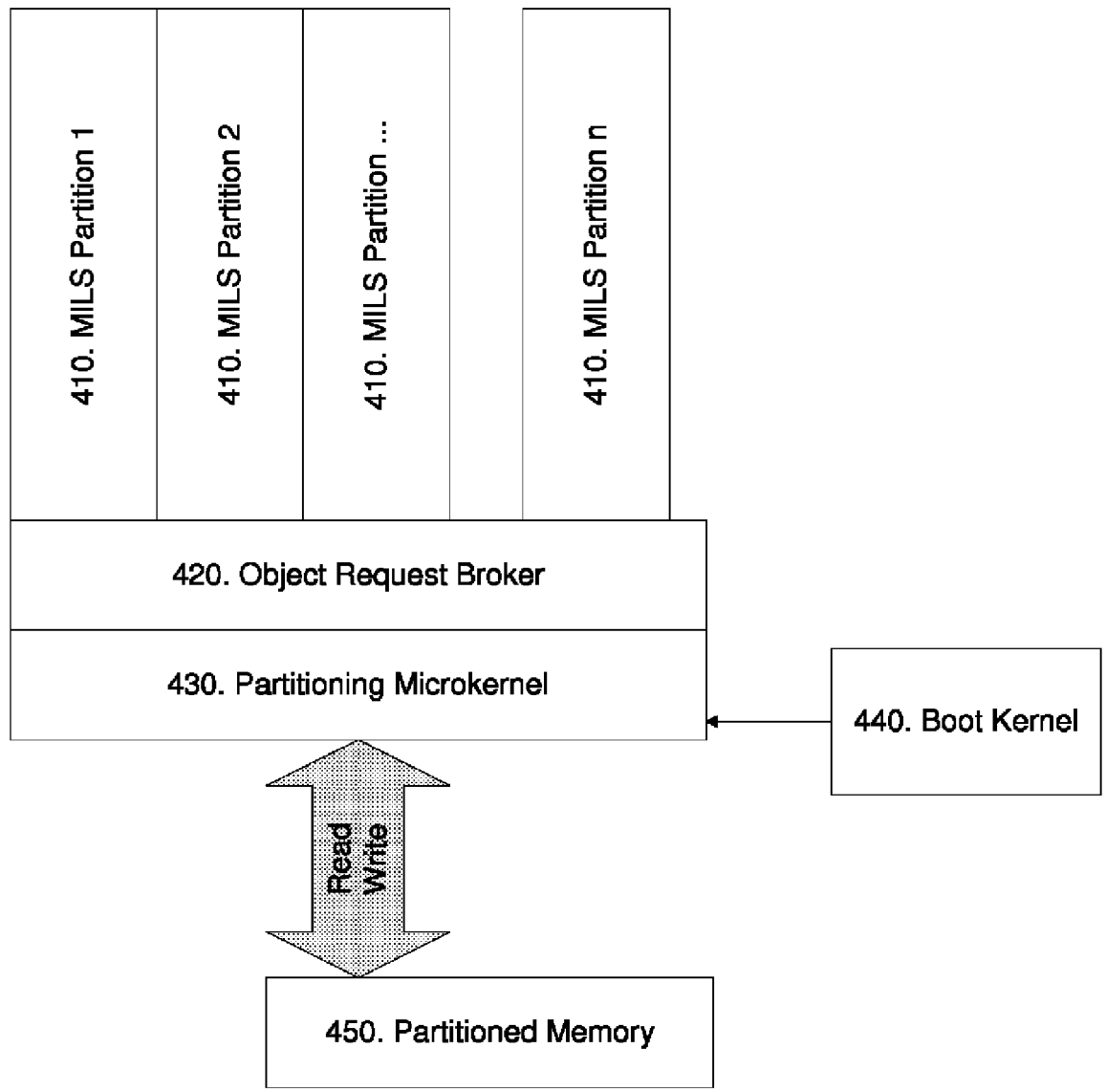
FIG. 4 is a block diagram depiction of the elements of yet another embodiment with an object request broker linking several MILS partitions to a partitioning microkernel.

Referring now to FIG. 4, there is illustrated one embodiment of a HAWCS system within a single CPU. This architecture may be running inside a radio core, like a wired or wireless modem in PCI, PCMCIA or other form factor or on a cell phone, desktop, laptop, PDA or other such computing device. In such a system, processing and protection code like IP Stacks, modem code, and protection mechanisms like filtering and firewalls can exist in contained memory partitions 410. In the case that this architecture is running on a device, like a laptop, desktop, PDA, cell phone, primary CPU, etc., one or more partitions 410 contain the system's operating system, e.g. Windows, Linux, etc. The MILS or MILS-like ORB 420 provides communication and middleware set of services at a very high EAL trust level. The MILS or MILS-like partitioning microkernel PMK 430 is responsible for setting up and enforcing the memory partitions, with isolation and containment as described previously. The PMK can be instantiated by a boot kernel 440, whose function is to establish system integrity (of memory, CPU, power, etc.) and then booting PMK 430. Such functionality can be found in a system BIOS.

In one of these memory partitions 410 there exist protection mechanisms such as firewalls, filters and virus or malware checkers. These functions check all incoming data streams (network data for example) prior to them being routed to the operating systems running in adjacent memory partitions. The protection mechanisms also check all outgoing data streams similarly. Lastly, these protection mechanisms can operate on the active memory for a target operating system in another memory partition. Furthermore, these mechanisms can exist in the same partitions or in their own partitions. Also, these processes can leverage security mechanisms found in trusted platform modules (TPM).

It is within the scope of the invention to have one such partition with a set of protective processes that act as an interface to a TPM chip; being able to leverage the PMK partitioning that allows for the containment and separation of higher security classifications, so that similar functionality can be leveraged with TPM. A set of TPM processes can operate inside a memory partition, thus being able to leverage the higher processing capabilities of the CPU and the security functions of the TPM.

Figure 6A:
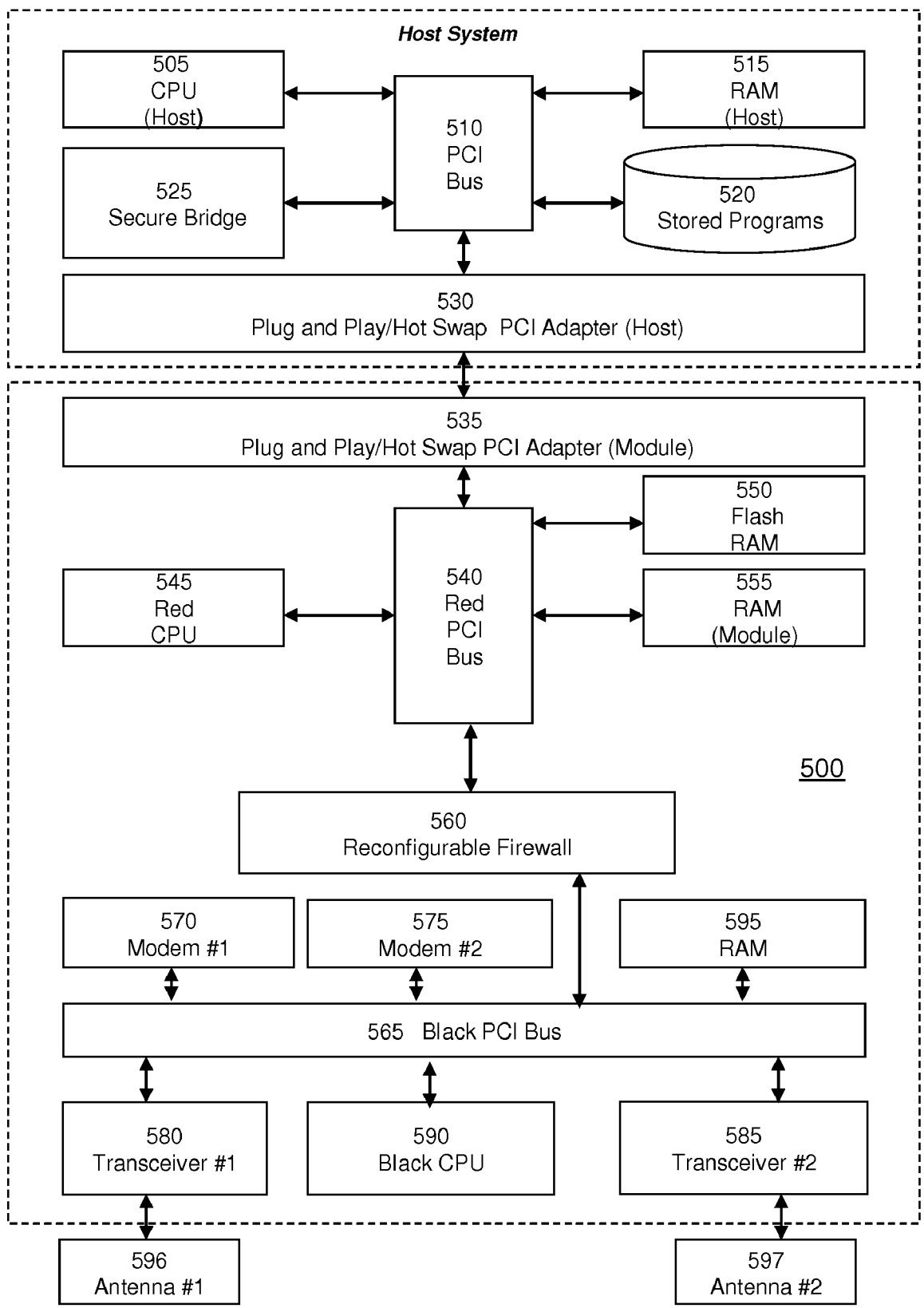
FIG. 6A is a block diagram perspective of one embodiment having a host system coupled to a multi-channel high assurance module in a wireless configuration and having a reconfigurable firewall.
Figure 7:
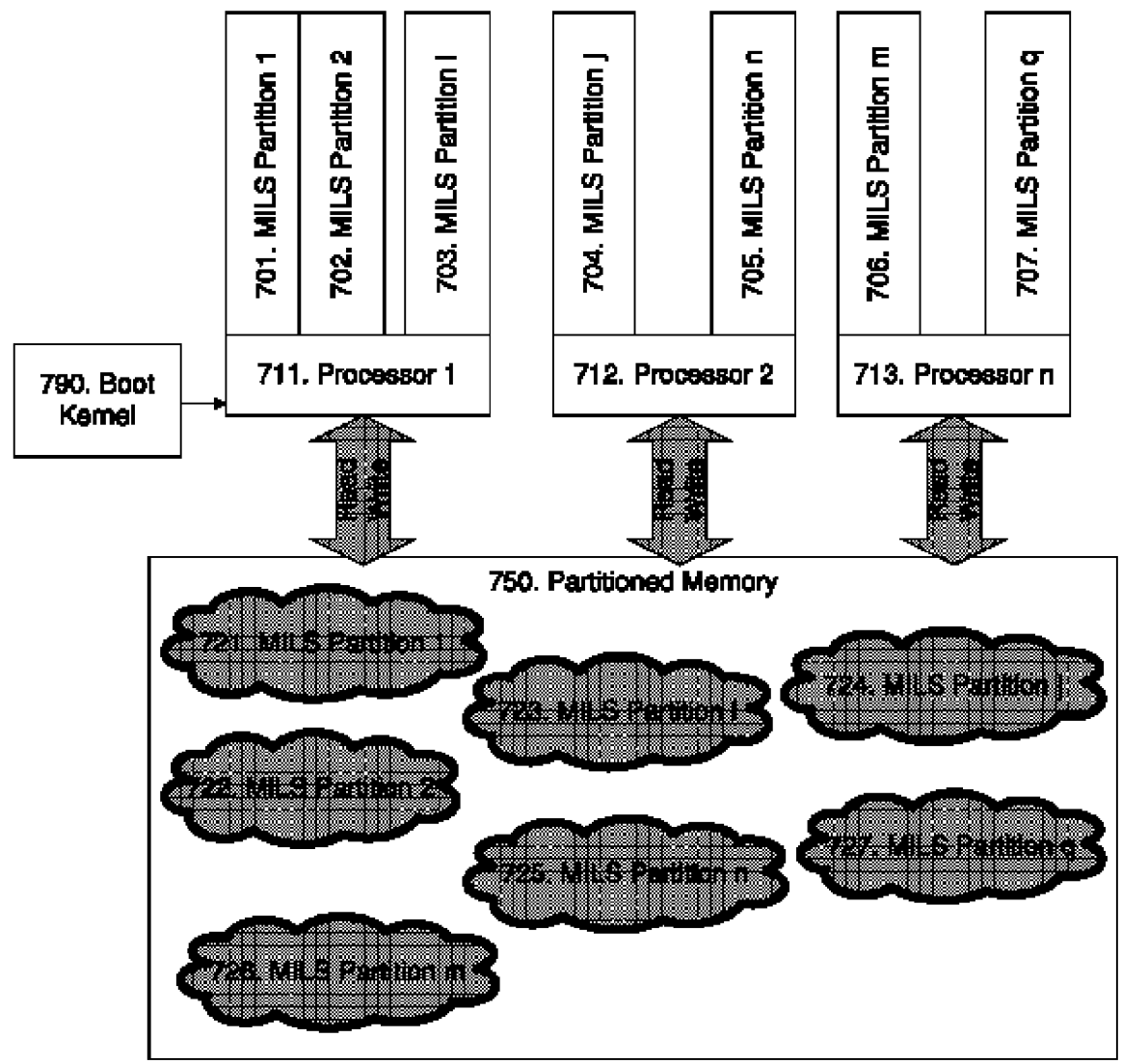
FIG. 7 is a block diagram depiction of elements of one embodiment with multiple processors linked to respective multiple MILS partitions and having read/write connection to a partitioned memory consisting of multiple MILS partitions.

Referring now to FIG. 6A, an embodiment of the invention is illustrated having a two channel high assurance plug-and-play wireless communication module 500, such as PCMCIA, CF or mini-PCI form factor, or other such PC cards. This embodiment implements a Red/Black isolation system similar to that used in military radios, and it is also possible to execute this embodiment in a one channel, or multi-channel card. In this embodiment, there are two different waveforms for illustrative purposes, namely IEEE 802.11 a/b/g (WIFI) and BlueTooth (BT). Components may include Plug and Play module 535, Red PCI Bus 540, Red CPU 545, as well as the reconfigurable firewall 560, Black PCI Bus 565, modem #1 570, modem #2 575, transceiver #1 580, transceiver #2 585, and the Black CPU 590. These components may be implemented on a single platform such as ASIC or a field-programmable gate array (FPGA) device, for example a Xilinx II Pro, which combines reconfigurable logic gates, I/O transceivers, general purpose processor core(s) and memory interfaces. Alternatively, a combination of FPGA, DSP, and WIFI or BT chipsets may be employed. It should be readily apparent that the communications channels do not have to be wireless. Furthermore, the channels can be software reconfigurable.

Antenna #1 596, modem #1 570 and transceiver #1 580 comprise the WIFI set, and in some instances the modem 570 and transceiver 580 may be integrated into a single integrated chipset. Antenna #2 597, modem #2 575 and transceiver #2 585 comprise the BT set, and in some instances modem #2 575 and transceiver #2 585 may also be combined into a single integrated chipset. The modems 570, 575 connect to the Black PCI bus 565, which in this example is a PCI bus, but could also be implemented with other bus structures and techniques, such as switched fabrics. The modems 570, 575 and transceivers 580, 585 may optionally be software-reconfigurable, as would be the case in a software defined radio (SDR), where reconfiguration is performed by the Black CPU 590 which downloads verified software from the Red CPU

545 via the Red PCI bus 540 (or other suitable bus structure), firewall 560, and Black PCI bus 565.

The Black CPU 590 with memory RAM 595 hosts the modems 570, 575. In addition, if encryption is employed to secure the data as in some VPNs, Black CPU 590 also generates the public and private keys and performs the Black side processing. The Black CPU 590 can be protected by computer security software in the manner of the invention, including, for example, a software firewall and anti-virus programs.

Black data from modems 570, 575 is sent to/from reconfigurable firewall 560, which in one embodiment is implemented in a FPGA. Reconfiguration of firewall 560 to adapt to changing security threats, update algorithms, or fix bugs, is performed from the Red side by Red CPU 545 via the Red PCI bus 540. The Red CPU 545 together with memory RAM 555 manages Red side security functions which include key generation, Red side encryption/decryption, network address translation (NAT), port address translation (PAT), Internet routing, management of demilitarized zone (DMZ) router functions, detection of port scanning, packet filtering and threat signature detection, and concealment (stealth) of unused ports. The Red CPU 545 can also be protected by anti-virus and firewall software in the manner of the invention. In addition, the Red CPU 545 is made to be self-booting by virtue of diagnostic and high assurance kernel software, and stored in the flash memory 550, which also includes plug-and-play support of the plug-and-play/hot swap PCI adapter module 535 or other suitable plug-and-play/hot swap interface. A log file of detected attacks and other key security incidents such as downloads are also logged and stored on both flash memory 550 and host system hard disk 520.

The host system includes host CPU 505, PCI bus 510 or other bus structure, memory module 515, hard disk 520, and security module/network interface bridge 525. The host system provides certain services to the high assurance wireless system, including storage of applications, firewall and modem software used for re-boots, event logging, and hosting of system software including high assurance object request broker (ORB) middleware, and core framework (CF) software based on a software communications architecture (SCA). In instances where the high assurance wireless system is embedded within a mobile device, such as in a wireless PDA or smart phone, or Intel Centrino equipped laptop computer, certain variations of the architecture may be appropriate. For instance, the firewall function 560 may be moved to the secure bridge 525, and plug-and-play adapters 530 and 535 can be replaced with a PCI bridge (not shown).

Figure 6B:
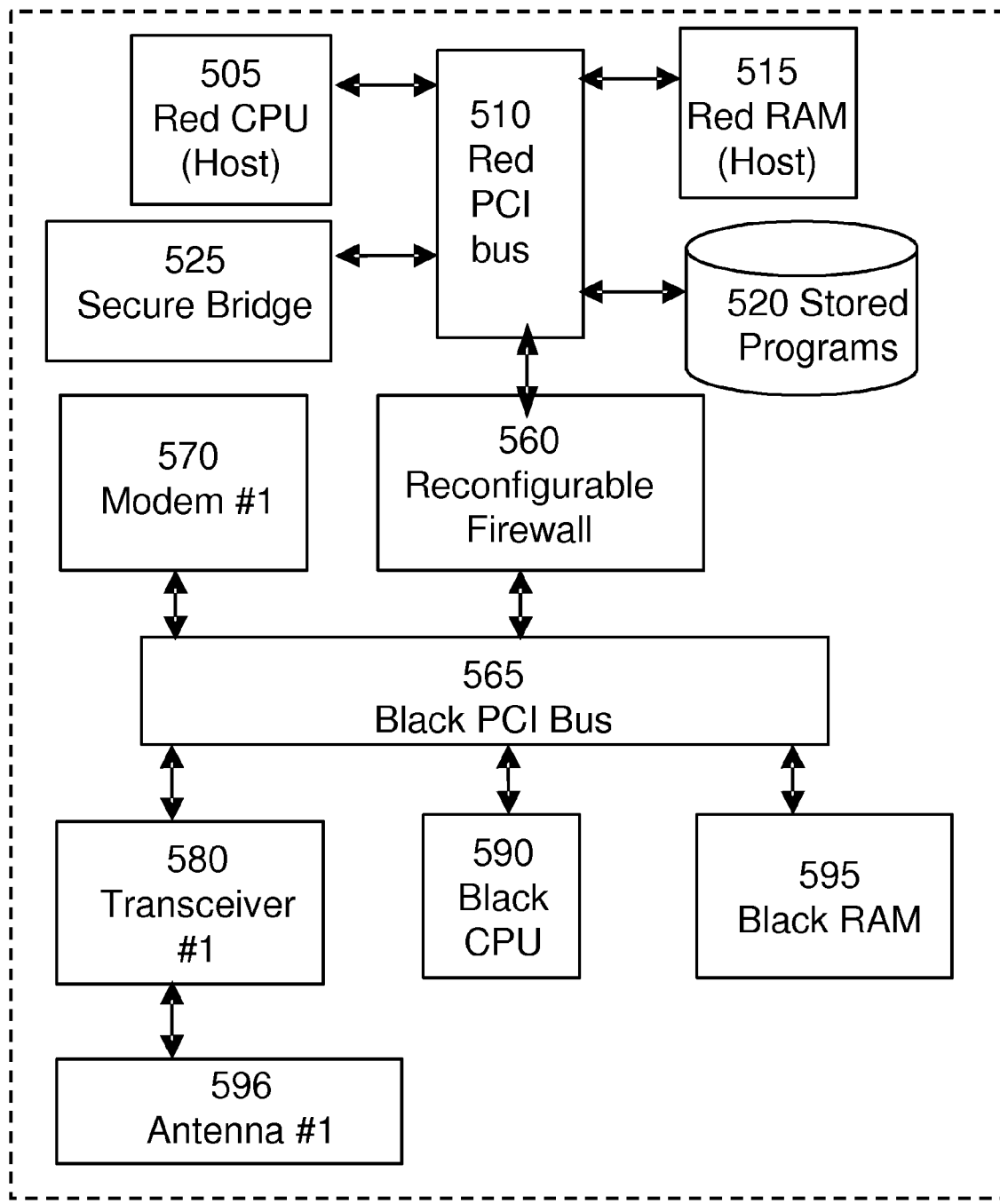
FIG. 6B is a block diagram perspective of a high assurance communications module configured with a blended protection scheme for a single channel with the elements of FIG. 6A integrated onto a motherboard.

Referring now to both FIGS. 6A and 6B, in other embedded installations, further simplification is possible if all components are mounted on the motherboard. For example, Red CPU 545 can be eliminated and its functions assumed by the host CPU 505; module RAM 555 can be eliminated and its functions assumed by the host RAM 515; flash memory 550 can be eliminated with log files only being written to hard disk 520; and Red PCI bus 540 can be eliminated with firewall 560 connecting directly to host PCI bus 510. Architecture for such an embedded application is illustrated in FIG. 6B. Note that this embodiment can be extended to multi-channel embodiments, just as shown in FIG. 6A.

This means that the Red core's "security kernel" or "high assurance kernel" is brought into the host CPU. An example of such a kernel is a partitioning kernel, similar but not limited to MILS and MILS-like kernels. As a result, all security functions like virus checking and firewalling, can be moved into the host CPU in accordance with the invention. By containing the protection mechanisms within the partitions, a data flow can be imposed that can not be bypassed, thus achieving an inline network flow. Thus, the methodology of the invention builds a system on top of layers of security and does not attempt to incorporate security features as an after thought. In the configurations of FIGS. 6A and 6B, as described above, separatings between the "red" main CPU and the "Black side" PCI, USB and other external busses can be the motherboard's chipset. This chipset can host firewalling and other protection capabilities typically found in the "Black" and or "Red" cores. In this case, the "Black core" can also be the controller for the various busses, and a fixed implementation device. This would place all protection mechanisms on the Red core, or in this case, the Red CPU. These protection mechanisms are all within the scope of the invention.

Figure 5:
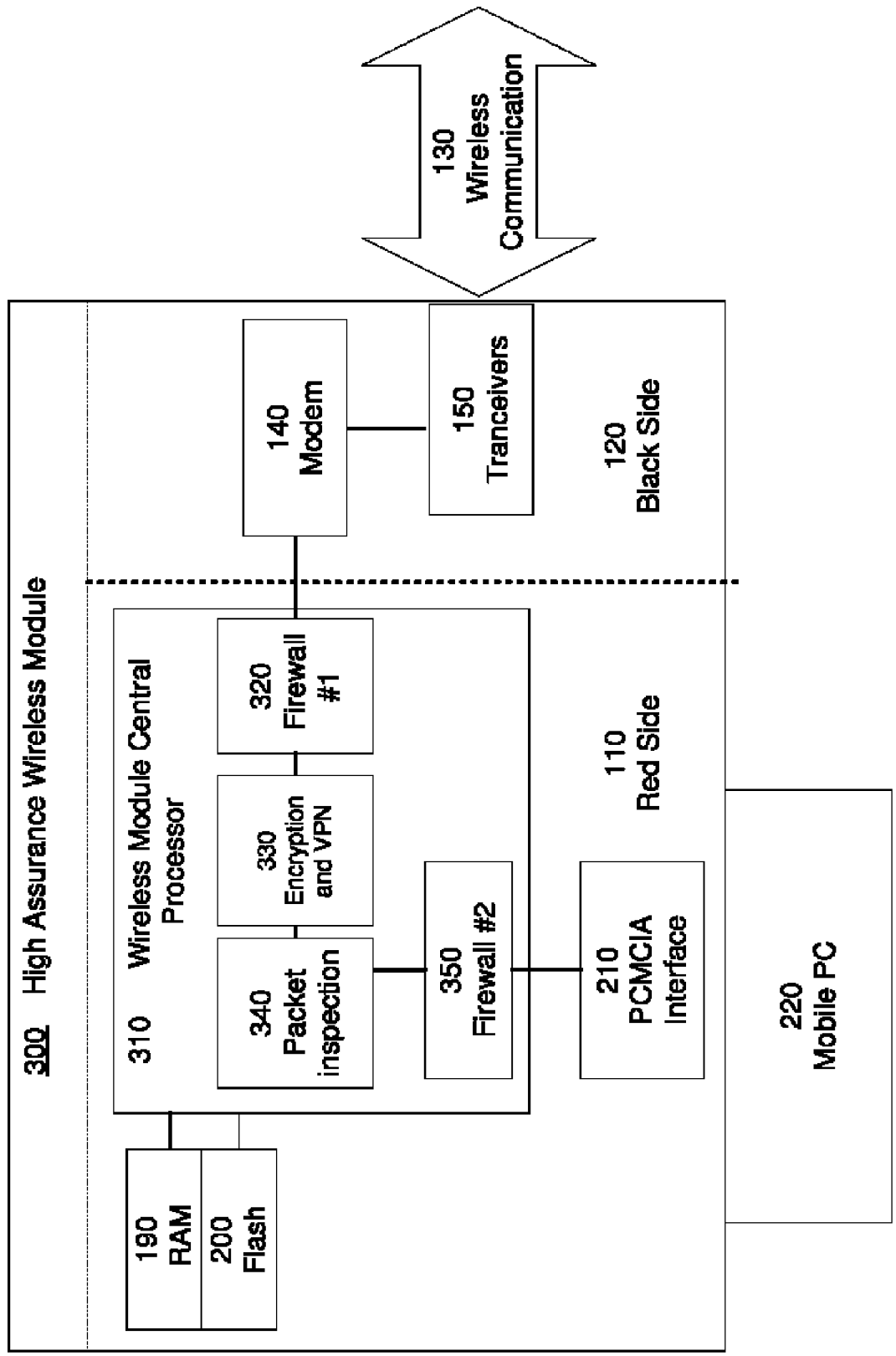
FIG. 5 is a block diagram perspective of an embodiment with a high assurance communications module configured with a blended protection scheme with an integral wireless module central processor.

FIG. 6A illustrates the removal of the "Red" core and usage of the CPU for such protection processes and security/high assurance kernels. In this figure, reconfigurable firewall 560 can be implemented on a motherboard's chipset that works in conjunction with the "red" CPU protection mechanisms. This is also described in Example 3 above. FIG. 6B is an extension of this and is described in Example 4 where the high assurance kernel's functions are used to maintain isolation and enforcement of data/information flow. Given that the CPU can host all "red" core radio functionalities, as shown in FIG. 5, it is evident that in a commercial variant, "Red" and "Black" core functionalities could be combined into a single core. With FIG. 6B teaching that Red code functionality can be moved into the Host/computer's main CPU and FIG. 5 teaching that both Red and Black functionality can be contained in the same processing module, so can a host CPU contain HAWCS by itself.

Referring now to FIG. 7, there is illustrated an embodiment of the invention in the form of a multi processor system utilizing a globally shared memory. In this possible scenario, the HAWCS boot kernel 790 loads into processor 711 before any other processor 712, 713, etc. is allowed to boot. The PMK on processor 711 then partitions all the memory space 750 for the various processes that will be running on the different processors. MILS partitions 1-*p*, 701-707, have access to their designated respective memory partitions 721-727.

A variation of the FIG. 7 embodiment provides that after the security layer boots on processor 711, a "slave" security layer can boot on each of the other various processors 712, 713, etc. Each slave layer is given its allocation of memory and the slave layer is then responsible for allocating the various partitions for the different processes running on its own CPU.

Yet another variation of FIG. 7 provides that when processor 711 boots up, it sets up all partitions for the various other processors, whether it be the individual partitions for the various processes or just a single partition for the whole processor. This allows for non-PMKs to boot on the different processors, but still be limited and contained by the PMK imposition of the memory partitions and boundaries. Thus processor 2-*n*, 712, 713, etc., look to see what memory is available and will not see the entirety of memory, just the memory that has been allocated for it. As a result, non-PMK processes and kernels can be contained with no modifications to their code base so long as sufficient memory is allocated for their respective usages.

Figure 8:
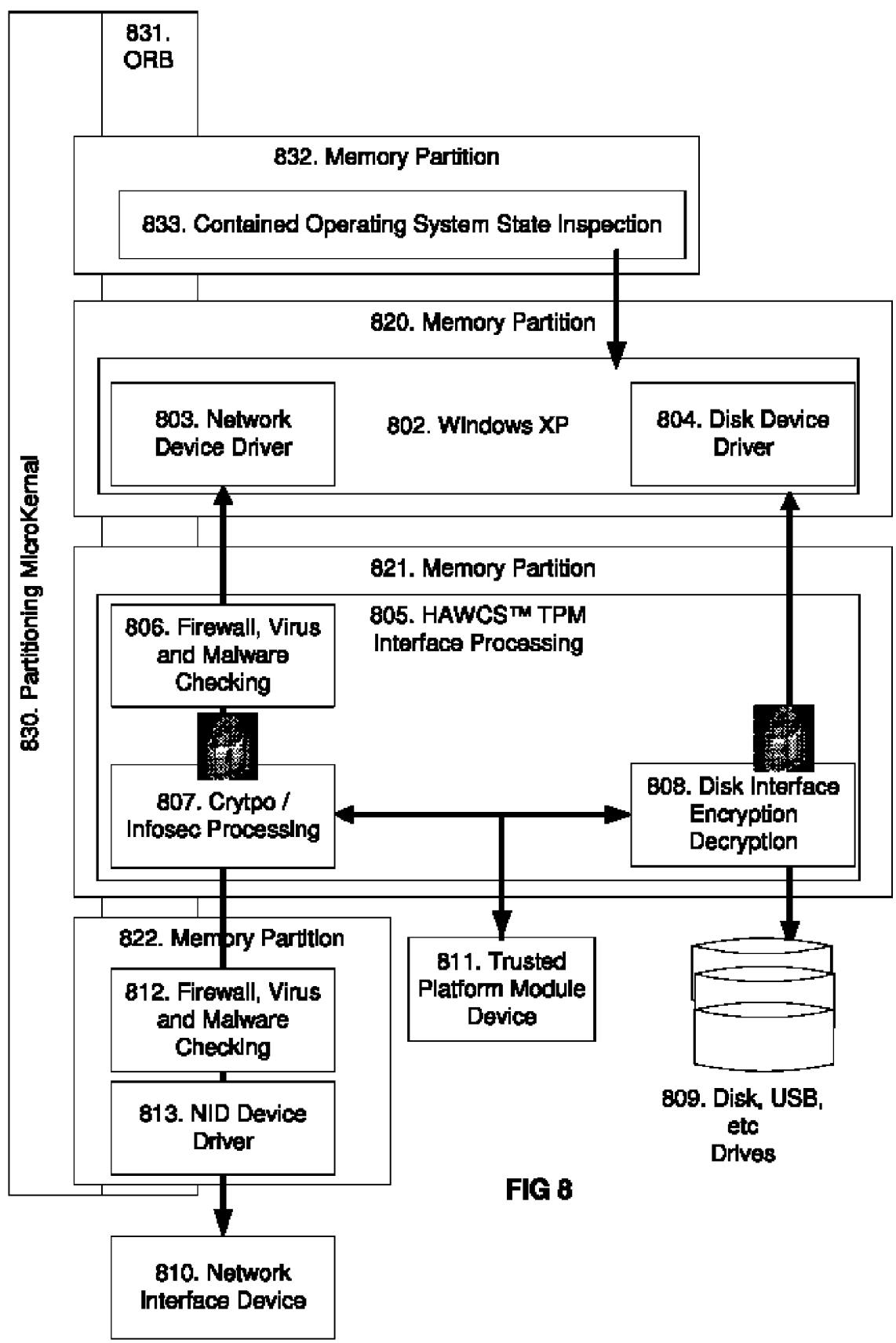
FIG. 8 is a block diagram depiction of elements of another embodiment illustrating isolation of a Windows XP operating system by at least two inline memory partitions of high assurance components from a network interface device.

Referring now to FIG. 8, there is illustrated for one embodiment the flow of data when a trusted platform module (TPM) is available. TPM is a published specification and the generic name for a chip, usually on a motherboard, that provides the ability to securely store information like crypto keys, remote attestation, random number generation, key generation, digital signatures, binding of information and sealing (encryption/decryption) of data. A separate partition 821 containing HAWCS-TPM interface process 805, can be added to the system so as to interface with TPM 811, abstracting away various functions of the TMP. One such result is that disk interface encryption/decryption process 808 within this partition can exist in the dataflow between the target COS 802 in its partition 820, and a hard drive 809, thus encrypting and decrypting data for the user, separate from the OS. Thus after a user is authenticated, which process 808 running in partition 821 can optionally be configured to help with, all reads and writes to the drive(s) 809 are encrypted by process 808 with no special drivers 804 installed on the target COS 802. In some embodiments, standard disk drivers are enhanced to be knowledgeable about the partitions, thus enhancing security and performance.

A further extension of the FIG. 8 embodiment includes providing an inline cyrpto/infosec possessing 807 that can be used to help establish secure VPNs like IPSEC, HAIPE, by providing the inline encryption and decryption of data, leveraging the TPM. Data coming in from network interface device NID 810 first flows into memory partition 822 containing a device driver 813 for the NID and a firewall and possibly virus and malware checking processes 812. Once the data passes the various protection checks, the data is then processed by the crypto/infosec processing 807 contained in separate memory partition 821. This processing can be decrypting an IPSec stream. After processing in crypto/infosec processing 807, the data is then handled by a second set of firewall, virus and malware checking 806. This set of checking can be contained in its own isolated memory partition. After passing the checks, the data is then passed on to or made available to the intended Windows XP COS 802's network device driver 803, that then passes it to the IP Stack and application within Windows XP COS 802.

Still referring to FIG. 8, network data flowing out of the computer, flows down the same path, though the same set of protection mechanisms. Data travels from an application or process running in the Windows XP COS 802, to network device driver 803 and then passes to the next memory partition to the firewall, virus and malware checking 806. If it passes the checks, it is then sent to the crypto/infosec process 807 where, if it matches the rule set, is encrypted into a VPN-like IPSec. Next, the data passes through the last set of firewalls 812 before being sent to the device driver 813 and then NID 810.

NID Device Driver 813 can optionally be eliminated for certain devices. One example is a network device that handles automatically all OSI layer 1 and 2 information with only a few messages being sent from COS 802 and the device through DMA, memory access that is examined and monitored by the HACWS™ protection processes 805.

Both the crypto/infosec processing 807 and the Disk Interface Encryption/Decryption 808 can access TPM 811 for, but not limited to, key signing, storage, retrieval and random number generation.

Still referring to FIG. 8, it should be noted that all processes running in memory partitions imposed by PMK 830 are operating within a possible single to multi-unit CPU system as has been described herein. Object request broker ORB 831 may be employed for moving data between partitions and processes. It should be further noted that this methodology can also provide protection for multiple running instances of various target COS's 802. This can be multiple instances of the same COS or of various different COS's.

It should be further noted that the disk encryption capabilities/functions can be broken away from the HAWCS™ processing. It can be placed in its own memory partition, it can be provided independent, alone or without HAWCS™ processing. It is included in FIG. 8 for simplicity but can be developed and deployed independent of the HAWCS™ data flow architecture shown.

Figure 9:
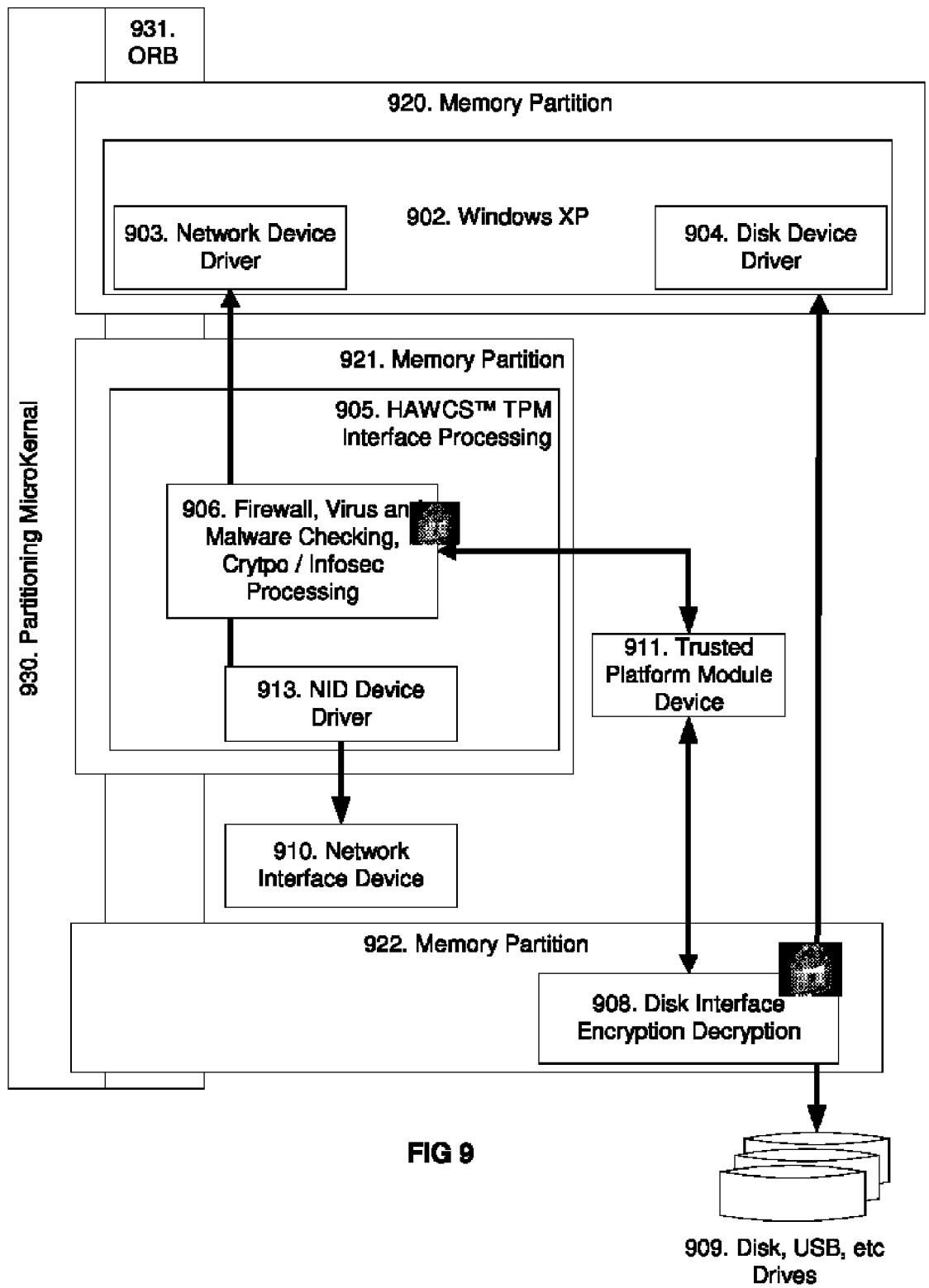
FIG. 9 is a block diagram depiction of elements of still another embodiment illustrating isolation of a Windows XP operating system by one memory partition from a network interface device and by another memory partition from disk and USB drives.

Referring now to FIG. 9, there is illustrated another variation of the flow of data when a trusted platform module TPM is available. A separate partition 921, containing the HAWCS processes 905 interfaces to TPM 911, abstracting away the various functions of the TMP for network level encryption of data by firewall, virus and malware checking, cyrpto/infosec processes 906. Another memory partition 922 is present in the data stream between the target COS 902 in its partition 920, and hard drive 909, where disk interface encryption decryption process 908 resides. Process 908 provides capability for encrypting and decrypting data for the user. Thus after a user is authenticated, all reads and writes to drive(s) 909 are encrypted by processes 908 with disk device drivers 904 installed on the target COS 902. As in other embodiments, standard disk drivers 904 may be enhanced to be knowledgeable about the partitions, thus possibly enhancing security and performance.

Inline cyrpto/infosec possesses 906 can be used to help establish secure VPNs like IPSEC, HAIPE, by providing the inline encryption and decryption of data, leveraging the TPM. This is combined in this case with firewall, malware and virus checking. Data coming in from network interface device NID 910 flows into memory partition 921 containing at device driver NID 913 and firewall and virus and malware checking processes 906. Once the data passes the various protection checks, it is then processed by crypto/infosec processes 906. This processing can be decrypting an IPSec stream. After processing in the crypto/infosec processing 906, the data is then checked again by the firewall, virus and malware checking processes 906. After passing the checks, it is then passed on or made available to the intended Windows XP COS 902's network device driver 903 that then passes it to the IP Stack and application within Windows XP COS 902.

Still referring to FIG. 9, network data flowing out of the computer flows down the same path, though the same set of protection mechanisms. Data travels from an application or process running in the COS, to the network device driver 903 and then passes to the next memory partition 921 and to the firewall, virus and malware checking process and crypto/infosec processing 906 where, if it matches the rule set, is encrypted into a VPN like IPSec. Next, the data is sent to device driver 913 and then NID 910.

Device driver 913 may be eliminated for certain devices. One example is a network device that handles automatically all OSI layer 1 and 2 information with only a few messages being sent from the COS and the device through DMA, memory access that is examined and monitored by the HACWS protection processes.

Both the crypto/infosec process 906 and the disk interface encryption decryption process 908 can access TPM 911 for, but not limited to, key signing, storage, retrieval and random number generation. Furthermore, processes within its own memory partition can provide the behavior and functionality of a TPM device. Since PMK 930 boots up in a manner that is difficult to circumvent, it can also create a memory partition containing processes that can provide security functionality like that found in a TPM device. As a contained process, it would be difficult for an operator working within a COS to alter or bypass the functionality provided by such a contained TPM mimicking process.

All processes running in memory partitions imposed by PMK 930 are operating within a possible single to multi-unit CPU system as described previously. This also provides protection for multiple running instances of various target COS's. This can be multiple instances of the same COS or of various different COS's.

In systems of the invention, when a PMK or other enforcement/security kernel boots, it can load in a protected section a process or processes that can prompt the user for a login and password or finger print, biometric, security card, pass code, or other authentication information, to provide authentication for the user. The authentication process can interface with the TPM for stronger authentication means as currently found today on TMP based authentication systems. In accordance with the invention, with respect to security, the authentication processes can be loaded in their own contained section of memory that cannot be touched save for the well defined boundaries and interfaces imposed by the PMK. In this sense, the authentication capabilities are outside of an area a malicious user can normally access. The only means to interface the authentication system are those defined explicitly by the authentication processes and imposed or enforced by the security kernel PMK. Such a contained authentication system can unlock encrypted disk portions, providing the correct key specific for the user is supplied. It can also be used to load the correct or defined set of processes, e.g. applications, contained operating systems, etc., for a user. The authentication can further provide a means to pass the authentication information into the COS so a user need only log in once and is able to be authenticated to multiple instances of COS's.

Referring to FIGS. 8 and 9, a set of authentication processes can reside in the same or another memory partition as other security or authentication processes. This can provide continuous user authentication that monitors user behavior and situational awareness, including but not limited to radio metric, network metric, biometrics, time of access, location of access, means of access, patterns of access, attack and threat levels (from viruses, hackers, malware, etc.) and other measurable factors that can be fused into a situational awareness confidence level, allowing for the system to challenge a user or deny access and even inform home network or other computers within a network of potential issues.

Also, security and authentication processes can be networked with other firewall, protection and authentication mechanisms within a network, passing and gathering information about state and trust levels. Such other networked mechanisms can include or be other user terminals or protection-based servers and appliances.

Figure 10:
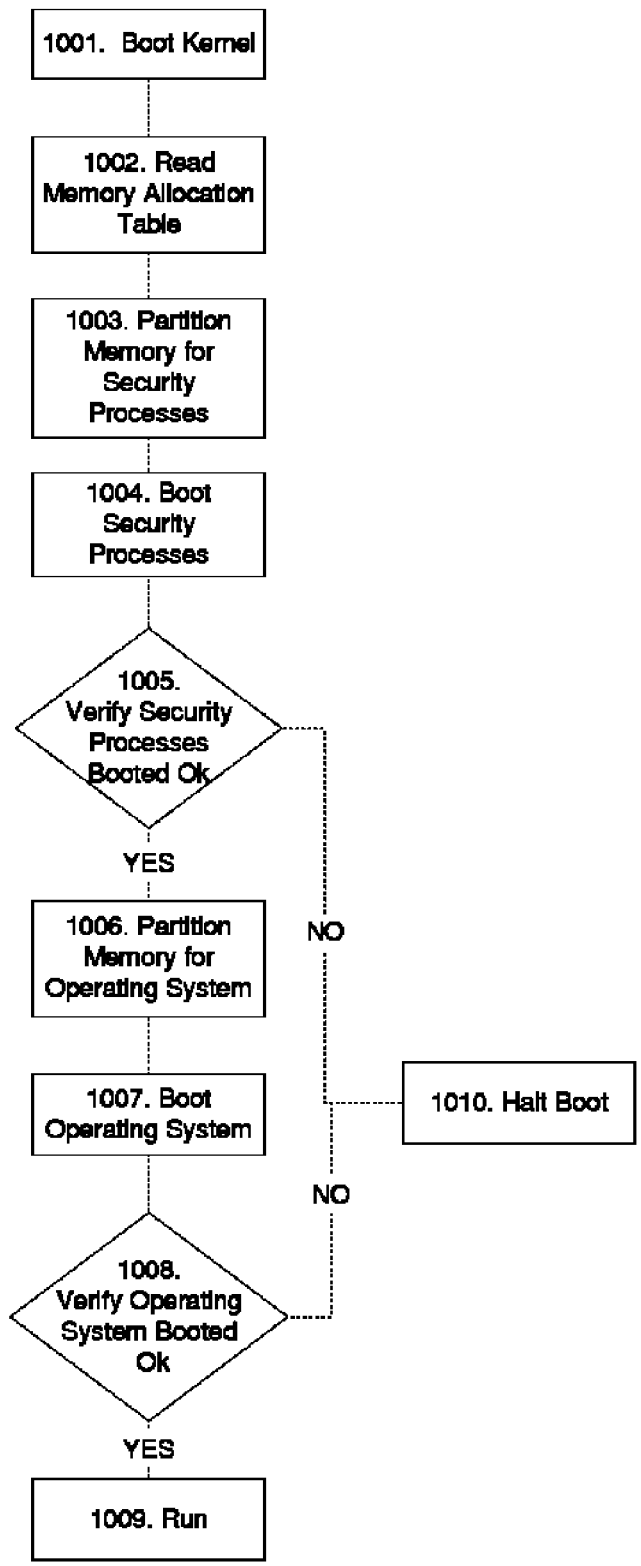
FIG. 10 is a flow chart illustrating steps of one aspect of the invention where a boot kernel initiates in sequence, partitioning for security processes, conducting security processes, partitioning for an operating system, and booting of an operating system.

Referring to FIG. 10, a simplified flow chart outlines an example of a boot process of the invention for a high assurance kernel with a set of security processes and a contained operating system. When the computer starts, it first boots 1001 the high assurance kernel. The booted kernel then reads 1002 what memory partitions it must set up and how the memory isolation should be enforced. Based on this information, it then establishes 1003 the memory partition(s) for the security processes, boots 1004 the security processes and verifies 1005 the security processes are operating correctly. If they are not operating, it can then halt 1010 the booting process and inform the user of the error. Else, the high assurance kernel will then partition 1006 the needed memory for the operating system(s) and then boot 1007 the operating system or systems. If the operating system fails to boot, the booting process is halted 1010 and user can be informed. Else everything is allows to run 1009 normally.

Figure 11:
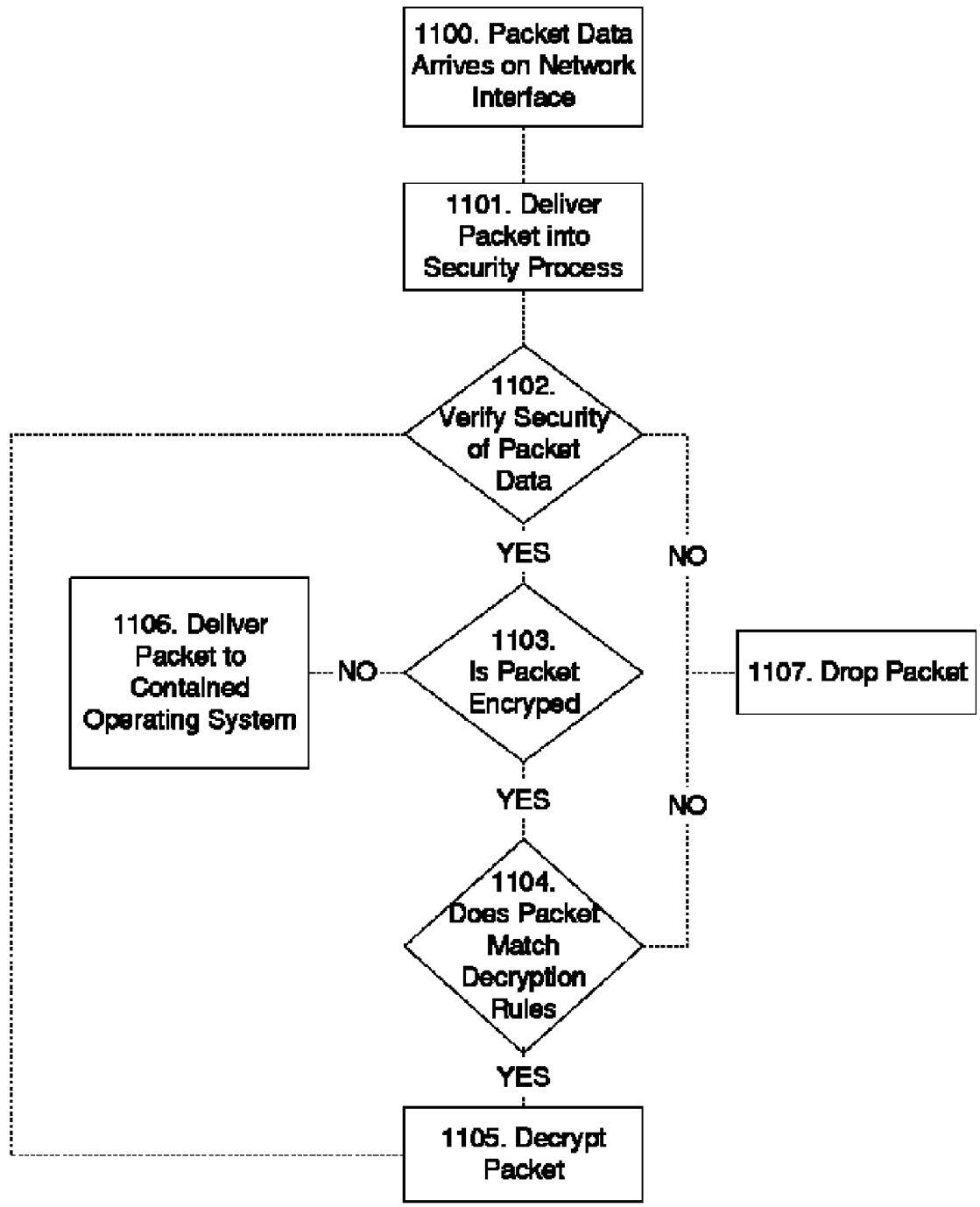
FIG. 11 is a flow chart illustrating steps of another aspect of the invention where packet data arriving on a network interface is delivered to a security process for verifying and decryption if required, and then delivered to a contained operating system.

Referring to FIG. 11, there is illustrated in this flow chart an example of a chain of events as data is passed to a contained operating system. First a packet data arrives 1100 at a network interface and is written 1101 to the memory for the security processes. The security processes then verify 1102 the packet data passes all checks like firewall and virus checking. If any of the checks fail, the packet is dropped 1107 and not delivered to the contained operating system. Else, the packet is then checked 1104 to see if it is encrypted. If it is not encrypted, it is delivered 1106 to the contained operating system. If it is encrypted, it is checked 1104 to see if it matches any of the decryption rules: an example being IPSec flow lookup tables. If the packet does not match a decryption rule, it is then dropped 1107. Else the security processes then verify 1102 the packet data passes all checks like firewall and virus checking. This is useful since network attacks and viruses can come from trusted computers within a virtual private network. If the packet fails the security checks, it is then dropped 1107. Else it is checked 1103 to see if it is encrypted. If it is not encrypted, it is delivered 1106 to the contained operating system.

In this document, when referencing MILS, this refers to Multiple Levels of Security technology or MILS like technology. MILS is a difficult certification to attain but it is possible to utilize those MILS certified applications like PMK and ORBs without having to recertify them for the target platform. This brings a very high assurance level and confidence level to the target system over lesser inspected, certified and/or assurance level software. Current means of memory partitioning utilize a MMU to help enforce memory boundaries and partitions. It is within the scope of the invention that the distinction between software and firmware are blended the wherein the "hardware MMU" has the ability to provide the same functionality by other means. One such example would be the implantation of a MMU inside FPGA gates.

Also, the references to TCM (Trusted Computing Module) and TPM (Trusted Platform Module) are interchangeable and refer to the same. TCM is another name for TPM.

PMK are very small and thus it is possible to store the PMK in an area more difficult to access (in other words not on a hard drive). This helps protect the memory partitioning system from attacks either from software running on the system or from a malicious user of the system removing a drive to try to access and alter the PMK. Thus, the PMK (and associated layers like ORB and protection functions) can be stored on a flash or BIOS device on a computer's main memory. Another means include but are not limited to having the boot kernel be able to access, for example through a TPM, a special encryption key and decrypt means that can then read the needed PMK, and other data from a hard drive. Thus the PMK can reside on a hard drive such as a flash drive, USB drive, CD, DVD, etc., in an encrypted state and only the BIOS could unlock/decrypt it. This makes tampering with the PMK and associated software very difficult.

Other and numerous embodiments and equivalents, including methods and devices, are within the scope of the invention. For example, there is a method for operating a multi processor system with shared memory and at least one hardware memory management unit, that includes the steps of: booting a first memory partitioning kernel in one processor; seizing control of the hardware memory management unit by the memory partitioning kernel; partitioning the available memory so as to allocate and isolate a specific region of memory for each respective processor; booting processes in the processors; and limiting memory access by each processor to its respective specific region of memory.

The system may be an FPGA, DSP, GPP, ASIC, motherboard chipset, or a PCI Device. The method may include the step: limiting data access by one region of memory to another region of memory to read-only privileges. The partitioning may include partitioning available memory for processes to run within a processor. The method may include a limiting by the hardware memory management unit of memory access and sub-partitioning of respective specific regions of memory, by other programs, to within specified ranges of memory.

It may further include limiting of subsequent changes to the memory isolation partitions to only the first memory partitioning kernel. It may also include the limiting of memory access by processors to their respective specific regions of memory as defined by the first memory partitioning kernel.

Another example builds on the prior example wherein one of the processes in one of processors in a multi-processor embodiment has a respective process-specific memory partitioning kernel, the term "process-specific" meaning specific to or dedicated to a particular process, where the general method is extended to the further steps of: booting the process-specific memory partitioning kernel and therewith seizing control of a respective process-specific hardware memory management unit by the process-specific memory partitioning kernel; sub-partitioning the respective specific region of available memory so as to allocate and isolate a process-specific sub region of memory for that process; then booting the process and limiting memory access by the process to its respective sub region of memory.

Another example of the invention is a method for operating a computing system including the steps of: booting a high assurance kernel such as have been described herein; partitioning the available memory so as to allocate and isolate respective specific regions of memory for at least one computer program and at least one security process; inspecting with the security process the incoming network data intended for the computer program; delivering inspected incoming network data to the intended computer program; inspecting with the security process outgoing network data from the computer program; and delivering inspected outgoing network data to an intended device.

As elsewhere described, the security process may be or include any of firewall, virus and malware checking processes. Inspecting the incoming network data may include conducting respective firewall, virus and malware checks on the incoming network data. The method may include conducting an encryption/decryption process on the incoming and outgoing network data within the security process; and may further include accessing encryption/decryption keys from a trusted computing module. It may include conducting an encryption/decryption process on both incoming and outgoing file data within the security process. There may be a step for inspecting with the security process the specific region of memory associated with that computer program for anomalies such as infections, viruses, rootkits or other unintended alterations to the computer program. It may include conducting virus checking on incoming and outgoing file data within the security process. As described elsewhere herein, the PMK or high assurance kernel may be a memory partitioning kernel, the step of partitioning available memory being done by the memory partitioning kernel.

As yet another example, there is a method for operating a computing system including the steps of: booting a high assurance kernel; partitioning available memory so as to allocate and isolate respective specific areas of memory for at least each of a computer program and a security process; restricting access by the computer program to the area of memory of the security process; imposing a data flow requiring incoming data to be subjected to the security process before being delivered to the computer program; inspecting with the security process incoming network data intended for the computer program; delivering inspected incoming network data to the computer program; inspecting with the security process outgoing network data from the computer program; delivering inspected outgoing network data to an intended device; where the security process includes any or all of a firewall, virus or malware checking processes, and the inspecting of the incoming network data includes conducting any or all of firewall, virus and malware checks on the incoming network data.

This example may further include: conducting virus checking on incoming and outgoing file data within the security process; conducting an encryption/decryption process on the incoming and outgoing file data within the security process; and inspecting with the security process the specific area of memory allocated to the computer program for anomalies in the computer program. It may include accessing encryption/decryption keys from a trusted computing module.

Still yet another example of the invention includes a computing system that includes a high assurance kernel; an operating system; a security process; and a network interface device; where the high assurance kernel is configured to upon being booted, impose a partitioning and management of memory and a sequencing of operation among the operating system and the security process whereby security checks are conducted on all data by the security process prior to the data being made accessible for a next processing step within the computing system. The system may include an object requester broker in association with the partitioning kernel for conducting its partitioning and memory management functions.

There may be an encryption/decryption process in the system that is also subject to the partitioning and management of memory and sequencing of operation by the kernel. There may be a trusted computing module also subject to the partitioning and management of memory and sequencing of operation by the kernel. The system may be a firewall; and it may be implemented on a common circuit board. The firewall may be implemented in a motherboard chipset.

An additional example of the invention is a device for providing a blended protection scheme for a high assurance communication device that includes: a reconfigurable firewall and packet inspection device of the nature described herein, for enforcing isolation and separation between a communication device's CPUs, memory, and the communication device, where the reconfigurable firewall is implemented on an integrated chip or motherboard chipset; and a protected CPU adapted to mange security functions and to reconfigure the reconfigurable firewall in the manner described herein. The device may be a firewall and virus infection inspection system. The device may be a virtual private network for network based communications.

Another additional example of the invention is a method for high assurance packet data processing in a computer system, which includes the steps:

delivering an arriving packet of data to a security process;
   verifying the security of the packet data with the security process, and if not verified then dropping the packet;
   checking the packet data for encryption, and if not encrypted then delivering it to a contained operating system as described elsewhere herein, for processing;
   checking the packet data for a match to decryption rules, and if not matched then dropping the packet; and
   decrypting the packet data and returning to step (2).

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto and equivalents thereof.

We claim:

1. A method for operating a multi processor system with shared memory and at least one hardware memory management unit, comprising the steps of:
    booting a first memory partitioning kernel in one processor;
    seizing control of said at least one hardware memory management unit by said memory partitioning kernel;
    partitioning available memory so as to allocate and isolate a specific region of memory for each respective processor;
    booting processes in said processors; and
    limiting memory access by each said processor to its respective said specific region of memory.

2. The method of claim 1, said multi processor system comprising one from among a group consisting of an FPGA, DSP, GPP, ASIC, motherboard chipset, and PCI Device.

3. The method of claim 1, further comprising:
    limiting data access by at least one said region of memory to another said region of memory to read-only.

4. The method of claim 1, said partitioning available memory comprising partitioning available memory for processes to run within a processor.

5. The method of claim 1, further comprising:
    limiting by the hardware memory management unit, of memory access and sub-Partitioning of respective specific regions of memory by other programs, to within specified ranges of memory.

6. The method of claim 1, further comprising:
    limiting subsequent changes to said memory isolation partitions to said first memory partitioning kernel.

7. The method of claim 1, further comprising:
    limiting memory access by processors to their respective specific regions of memory defined by said first memory partitioning kernel.

8. The method of claim 1, wherein a said process in said processors comprises a respective process-specific memory partitioning kernel, said method further comprising the steps of:
    booting said process-specific memory partitioning kernel and therewith
    seizing control of a respective process-specific hardware memory management unit by said process-specific memory partitioning kernel;
    sub-partitioning the respective said specific region of available memory so as to allocate and isolate a process-specific subregion of memory for each processor process; booting a process in said processor; and
    limiting memory access by said process to its respective said process-specific subregion of memory.

* * * * *